Feb. 26, 1957 F. J. KNIGHT 2,782,635
PULL TESTING TOOLS
Filed April 11, 1955 2 Sheets-Sheet 1
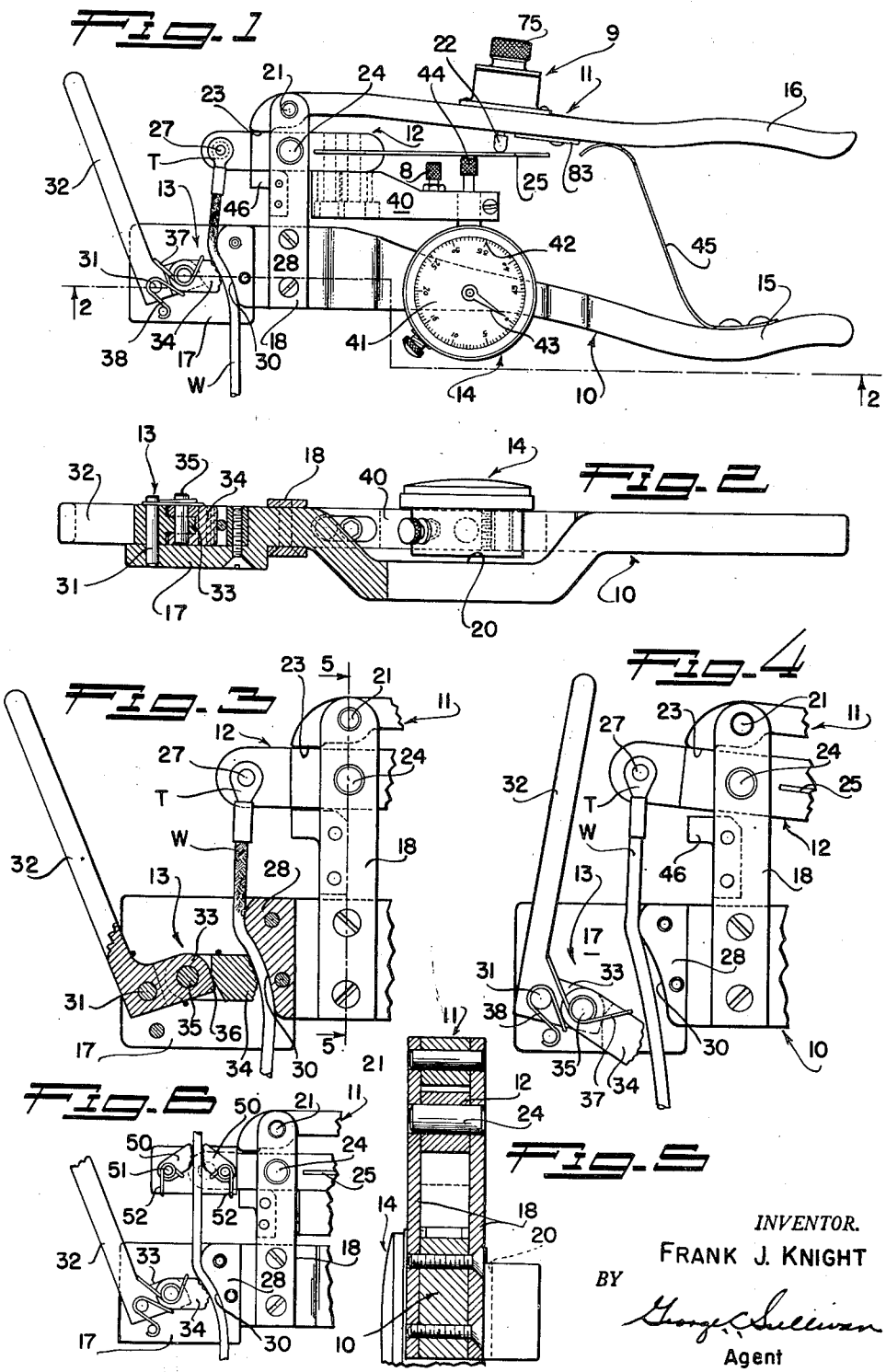
INVENTOR.
FRANK J. KNIGHT
BY
George C. Sullivan
Agent Feb. 26, 1957
F. J. KNIGHT
2,782,635
PULL TESTING TOOLS
Filed April 11, 1955
2 Sheets-Sheet 2
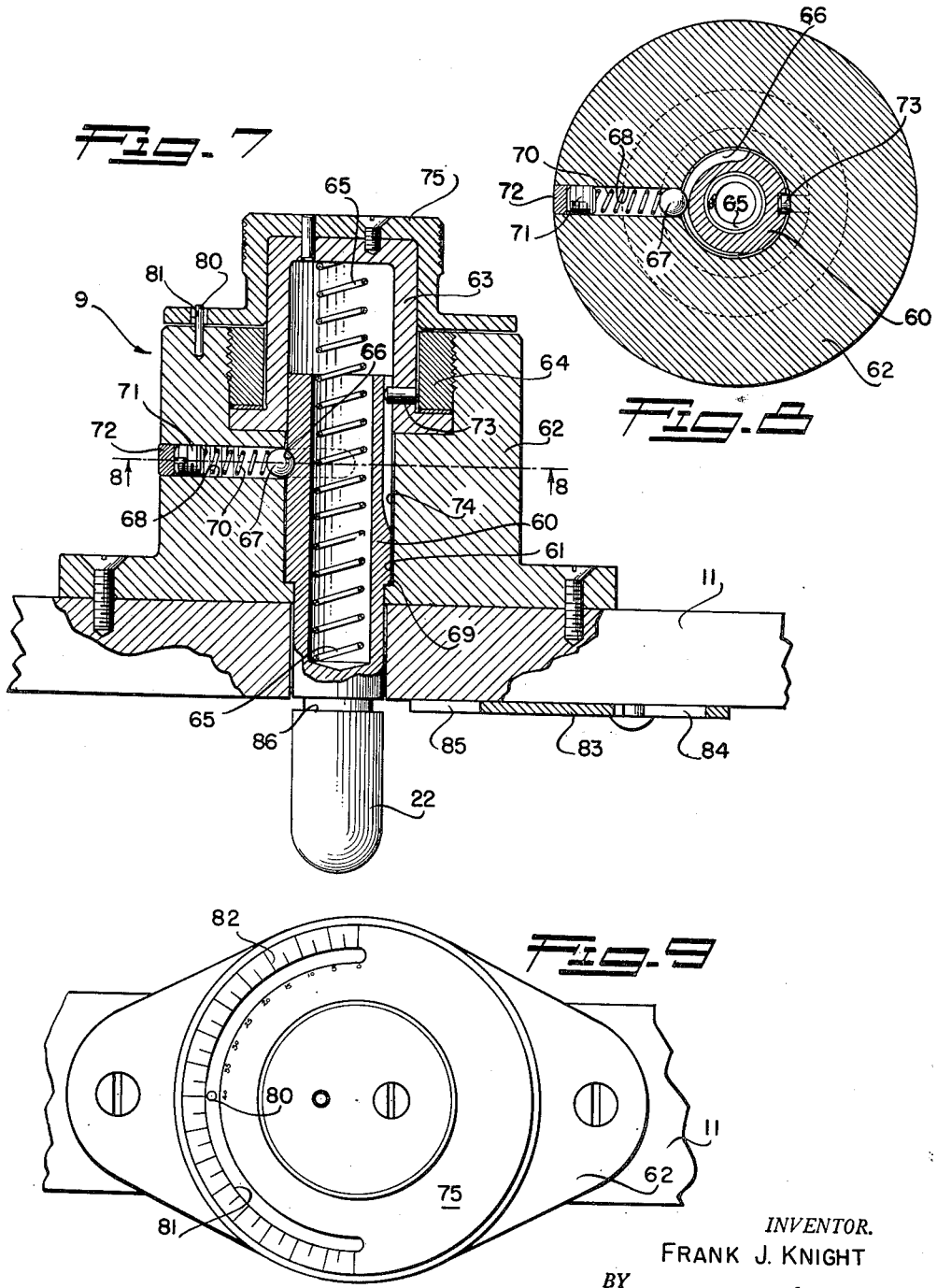
INVENTOR.
FRANK J. KNIGHT
BY
George C. Sullivan
Agent

United States Patent Office 2,782,635
Patented Feb. 26, 1957

2,782,635
PULL TESTING TOOLS

Frank J. Knight, Reseda, Calif., assignor to Lockheed Aircraft Corporation, Burbank, Calif.

Application April 11, 1955, Serial No. 500,470

8 Claims. (Cl. 73—95)

This invention relates to manually operated testing tools and relates more particularly to hand tools for pull testing terminal-wire assemblies, wires, rods, tapes, rope, cord, and the like.

The testing tools of this invention are capable of use in pull testing various objects, parts, and assemblies, and, of course, may be designed to handle or test particular parts and assemblies. In this specification the tools will be described as used to exert or apply testing tensile forces to wire-terminal assemblies and wires, it being understood that such references to particular or given uses are intended to be exemplary in character and are not restrictive. The tools as herein described are designed to pull test solderless wire-terminal assemblies. Such assemblies are used extensively in the aircraft and related industries and in the past it has been the practice to test effectiveness of the terminal connections on the wires by means of the test facilities and machines usually found in testing laboratories. This required the transportation of the assemblies from the work bench or assembly area to the laboratory, the use of costly laboratory equipment and the services of the laboratory technicians or engineers. Such testing was, of necessity, expensive and time consuming and did not permit in-line testing of the assemblies. Furthermore, such laboratory tests were customarily of the destructive type since it was usually desired to determine the full, ultimate strength of representative samples rather than to determine the quality of the assemblies to be actually installed. Accordingly, such laboratory tests did not necessarily truly reflect the condition of the actual production assemblies.

It is an object of the present invention to provide simple, inexpensive, compact, light-weight hand operated pull testing tools capable of use in the assembly area or at the work bench. The use of these tools obviates the need for the expensive time consuming laboratory tests and the attendant need for the laboratory equipment and the services of the laboratory technicians.

It is another and important object of the invention to provide tools of the character described operable to make non-destructive proof tests. This capability of the tools is highly desirable, particularly when testing pre-insulated terminals since, so far as I am aware, the only tests heretofore possible with such terminals were of the dstructive type.

Another object of the invention is to provide testing tools of this kind that are simple and convenient to operate and require a minimum of physical exertion. A manual grip force of only a few pounds is sufficient to produce a tensile or pull-out force of ample magnitude for a destructive test of terminals applied to wires of from 22 to 10 gauge. The tools may be designed and constructed to be plier-like in their general character for convenient operation in one hand of the user or operator.

Another object of the invention is to provide pull testing tools of the character referred to incorporating gauges or indicators calibrated in increments of tensile force, for example in pounds of pull being exerted, so that the user may readily ascertain the force or pull applied to the assembly being tested. For proof tests the tools may include means for limiting the action at a tensile force at or slightly in excess of the specified proof test load and subsequent to testing the wire-terminal assembly may be removed from the tool intact and unharmed.

Other objectives and features of the invention will become apparent from the following detailed description of typical preferred embodiments throughout which description reference will be made to the accompanying drawings in which:

Figure 1 is a side elevation of a testing tool of the invention in the unactuated condition with a wire-terminal assembly arranged in position for a test;

Figure 2 is a view taken substantially as indicated by line 2—2 on Figure 1 with one nose or jaw portion of the tool appearing in vertical cross-section;

Figure 3 is an enlarged fragmentary side elevation view of the outer portion of the tool with the wire gripping means appearing in cross-section;

Figure 4 is a view similar to Figure 3 with the wire gripping means released and appearing in side elevation;

Figure 5 is a detail sectional view taken as indicated by line 5—5 on Figure 3;

Figure 6 is a side elevation view of the forward or outer portion of another embodiment of the invention suitable for pull testing wires, rods, cords, ropes, etc.;

Figure 7 is an enlarged fragmentary longitudinal sectional view of the releasable and adjustable means adapting the tool for non-destructive proof testing of parts and assemblies;

Figure 8 is a transverse sectional view taken as indicated by line 8—8 on Figure 7; and Figure 9 is a face or plan view of the device or means shown in Figure 7 illustrating the calibrated dial of the same.

The tool of the invention illustrated in Figures 1 to 5 inclusive includes a pair of handles or levers 10 and 11, the lever 11 being pivoted with respect to the lever 10, a floating member or lever 12 also pivoted with respect to the lever 10 and acted upon by the lever 11, means 13 on the lever 10 and lever 12 for receiving and holding the part or assembly to be tested, a tensile force indicator 14 actuated by movement of the floating lever 12 relative to the handle lever 10, and manually regulable means 9 for relieving the tensile force applied to said part or assembly when making proof tests.

The handles or levers 10 and 11 are preferably constructed and related to be conveniently grasped in one hand of the user and the inner end portions 15 and 16 respectively of the levers are curved or bowed to conform with the hand. The outer end portion 17 of the lever 10 is broadened, has flat parallel sides and is offset laterally to carry the assembly gripping means 13, as will be later described. An arm 18 is secured to the lever 10 adjacent the portion 17 to project substantially at right angles from the lever. The arm 18 serves to support or carry the handle lever 11 and the floating lever 12. The arm 18 is preferably split or divided to better mount the levers 11 and 12, being in the form of two parallel bars or strips secured to opposite faces of the lever 10. As best shown in Figure 2, the handle lever 10 is offset or recessed at 20 to clear or receive the force indicator 14.

The handle lever 11 has its outer end portion received in the split arm 18 and is pivoted therein by a dowel or pivot pin 21. The inner side of the lever 11, that is the side facing the lever 10, is provided with a rounded projection 22 for acting upon or transmitting movement and force to the floating lever 12. This projection 22 is spaced a considerable distance from the pivot pin 21 and is an element or part of the means 9, to be later described. The outer end of the lever 11 is provided with a stop 23 just beyond the pivot pin 21 for limiting movement of the floating lever 12 in one direction.

The floating lever 12 is mounted in the split arm 18 on a pivot pin 24 to be spaced between the levers 10 and 11 and to pivot about an axis parallel with the axis of angular movement of the lever 11. The outer end of the lever 12 is equipped to mount or hold the part to be tested, as will be described below. The inner end of the lever 12 carries a leaf spring 25. The spring 25 is a normally flat or straight spring secured in a slot in the lever 12 to extend straight back from the lever. The projection 22 on the handle lever 11 is engageable with the spring 25 at a point a considerable distance from the pivot 24. When the handle levers 10 and 11 are "closed," that is moved toward one another, the projection 22 acting on the spring 25 deflects the spring and pivots the floating lever 12 on its pin 24. The deflection of the spring 25 actuates the indicator 14 and the angular movement of the lever 12 imposes the tensile load on the assembly being tested.

The means 13 on the outer or active end of the handle lever 10 and floating lever 12 for securing or anchoring the part to be tested may, of course, be varied to adapt the tool for the testing of assemblies and parts of different kinds. In the tool, shown in Figures 1 to 5 inclusive, the part to be tested is an assembly of a wire W and a solderless terminal T on an end of the wire. In this case the outer end of the floating lever 12 carries a stud 27 for engaging in the terminal T. The flat broadened portion 17 of the handle lever 10 has a releasable wire gripping mechanism for holding or gripping the wire W. This includes a block 28 secured on the portion 17 and presenting a curved abutment face 30. A dowel or pin 31 on the portion 17 carries a handle 32 for angular movement and this handle has a lug or lever arm 33 extending toward the abutment 30. The arm 33 is reduced in thickness and a cam or jaw 34 straddles the arm and is pivoted thereon by a pin 35. The jaw 34 has a roughened, serrated or toothed face opposing the abutment 30 and operable to engage the wire W. The arm 33 has a projection or finger 36 operable upon manual actuation of the handle 32 to cam against the jaw 34 and force the jaw toward the abutment 30, thus gripping the wire W between the jaw and abutment. A torsion spring 37 lightly urges the jaw against the finger 36 and a second torsion spring 38 acts against the arm 33 to lightly urge the arm in the direction to actuate the jaw. The springs 37 and 38 automatically condition the wire gripping means for actuation and assist in retaining the gripping means in gripping engagement with the wire W. Once the handle 32 has been actuated, the shape and relation of the jaw 34 and abutment 30 are such that maintained tension on the wire W tends to further tighten the gripping action of the jaw. Of course upon retraction of the handle 32, that is movement of the handle toward the lever 12, the jaw 34 is released permitting disengagement of the wire W.

The indicator 14 is not essential when the tool is used in non-destructive proof tests of terminal assemblies, and the like, since the tool may include stop means to limit to a given value the tension applied to the assemblies. However, for both non-destructive proof testing and destructive tests, the indicator 14 is desirable. The indicator 14 is arranged to be actuated by deflection or movement of the spring 25, such movement being related to or proportional to the tensile force applied to the terminal T and wire W upon operation of the tool. A mounting block or plate 40 is secured to the inner portion of the floating lever 12 to carry the indicator 14. The indicator 14 is secured to the plate 40 so as to be freely received in the recess 20 of the handle lever 10 where its dial 14 is conveniently visible to the user. As best shown in Figure 1, the indicator 14 includes a pointer 43 movable across the dial 41 which is provided with calibrations 42 whereby the pointer indicates in terms of pounds, for example, the tensile load applied to the part being tested. The indicator 14 further includes a stem 44 projecting from the plate 40 toward the spring 25 and arranged with its outer end in engagement with the spring. Upon deflection of the spring 25 this stem 44 is moved to actuate the indicating needle 43 across the calibrated dial 41. The indicator 14 may be of the type well known in the art, for example it may be what is known as an "Ames Number 102 Dial Indicator." It will be seen that upon operation of the handle levers 10 and 11 toward one another to impose a testing tensile load on the wire W and terminal T the action of the projection 22 on the spring 25 pivots the lever 12 to exert the tension on the parts being tested and also produces deflection of the spring, this deflection of the spring in turn actuating the indicator 14 to reveal or indicate the tensile force being applied to the assembly being tested.

A bent leaf spring 45 may be provided on the handle lever 10 to yieldingly bear against the inner side of the lever handle 11 to normally hold the levers 10 and 11 in their unactuated positions. It is preferred to provide a stop 46 on the split arm 18 to stop the floating lever 12 in its normal unactuated position shown in Figure 1. An adjustable stop pin 8 is threaded in the plate 40 to be engageable by the spring 25 for the purpose of preventing over-travel of the indicator stem 44.

Figure 6 illustrates a form or application of the invention suitable for testing wires, cords, and other elongate flexible parts and assemblies. In this case the stud 27, above described, is replaced by a gripping mechanism, the other parts and elements of the tool being the same as illustrated in Figures 1 to 5 inclusive. The gripping mechanism on the nose or outer end of the lever 12 comprises two dogs or jaws 50 secured to the lever by pivot pins 51. The active ends of the jaws 50 are serrated or toothed and the jaws are shaped and related so that these ends firmly grip the wire W, or the like, when the latter is tensioned. Torsion springs 52 cooperate with the jaws 50 to urge them into gripping or retaining cooperation with the wire W. The outer or active end of the handle lever 10 is provided with the abutment 30, jaw 34, jaw actuating arm 33, and handle 32, all as above described. It will be seen how the dogs or jaws 50 on the lever 12 and the abutment 30 and jaw 34 on the lever 10 grip and retain the wire W at spaced points when the levers 10 and 11 are actuated to operate the testing tool.

The above mentioned means 9 is carried on the lever 11 and cooperates with the spring 25 of the third lever 12. When the tool is to be used for non-destructive proof tests the means 9 may be set or adjusted to relieve the tensile force being exerted on the part or assembly tested when a selected tensile force is reached and thus indicate to the operator that the part has satisfactorily passed the proof test. The projection 22, above described, may be considered an element of the means 9 and is the rounded head or end of a pin 60 longitudinally movable and rotatable in an opening 61 in a block 62 secured on the outer side of the lever 11. A cap 63 receives the outer end of the pin 60 and is rotatably retained in the outer end of the block 62 by a nut or gland 64. The outer portion of the pin 60 is tubular to receive a compression spring 65. This spring 65 bears between an internal surface of the pin 60 and the inner side of the cap 63 to yieldingly urge the pin inwardly for cooperation with the spring 25 of the lever 12. A shoulder 69 on the wall of the opening 61 limits inward travel of the pin 60. The spring 65 is primarily intended to restore the pin 60 to its active position following retraction and of itself offers but slight resistance to retraction of the pin.

The means 9 further includes a circumferential cam face or groove 66 in the periphery of the pin 60. The groove 66 may extend for more than 180° and gradually increases in depth from one end to the other. A retractable spring loaded member 67 is provided in the block 62 to cooperate with the groove 66 in the pin 60.

In practice, this member 67 may be a ball arranged in a radial bore 68 in the block 62 and urged radially inward into cooperation with the groove 66 by a spring 70 in the bore. The spring 70 is engaged under compression between the ball 67 and a plug or set screw 71 threaded in the bore 68. The pressure or compression on the spring 70 may be set or regulated by means of the set screw 71 when initially assembling and calibrating the tool and when the spring has been correctly regulated the set screw may be sealed in place by a seal 72. The means 9 is manually adjustable or regulable to limit the pull to be exerted on the tested parts to any selected pull value or tensile force. The cap 63 is keyed to the pin 60 by a dowel 73 engaging in a longitudinal groove or keyway 74 in the pin. A handle and dial plate 75 is secured to the outer end of the cap 63 and is flanged to overlie the outer end of the block 62. The periphery of the plate 75 is knurled to facilitate manual turning of the cap 63 and turning of the pin 60 through the medium of the dowel 73 and keyway 74. Such rotation of the pin 60 adjusts the groove 66 relative to the spring loaded ball 67, bringing deeper or shallower portions of the groove into cooperation with the ball so that greater or lesser axial loads on the pin will release the ball from the groove. Thus with the pin 60 set or adjusted to an intermediate position, such as illustrated in Figures 7 and 8 of the drawings, a medium longitudinal force on the pin 60, exerted thereon by reason of relative pivoting of the levers 10 and 11 which presses the projection 22 against the spring 25, will cause sudden disengagement of the ball 67 from the groove 66, thus suddenly relieving the tensile load being applied to the part tested. A marker or pointer pin 80 projects from the end of the block 62 and is received in a partially circular slot 81 in the plate 75 to limit rotary adjustment of the pin 60 and to indicate the angular position of the groove 66 relative to the spring loaded ball 67. Calibrations 82 are provided at the groove 81 to facilitate accurate manual regulation of the means 9 to release or disengage when selected test pull loads are applied to the part being tested. From the foregoing it will be seen that the means 9 may be set or regulated to cause the tensile force being applied to a part or assembly tested to suddenly release or diminish when a given tensile value is reached. This facilitates employment of the tool as a proof testing device operable to proof test parts and assemblies to any selected or given pull load without breaking or destruction of the same unless the parts tested are defective.

Means is provided for locking the pin 60 against axial movement in order that the tool may be used for testing parts and assemblies to destruction for a determination of their ultimate strengths. This means may comprise a simple notched slide 83 shiftably secured to the inner side of the lever 11 by a pin and slot connection 84. The extremity of the slide 83 is forked at 85 to engage with an annular external groove 86 in the pin 60. The groove 86 is provided in the pin 60 at the base of the rounded projection 22 and when the slide 83 is in its operative position where its fork 85 engages in the groove 86 the projection 22 is conditioned for engagement with the spring 25 of the third lever 12, the pin 60 being held in the position illustrated in the drawings.

In using the testing tool shown in Figures 1 to 5 inclusive, the terminal T of the assembly to be tested is engaged on the stud 27 and the wire W is trained or arranged between the abutment 30 and the jaw 34. The handle 32 is moved to actuate or set the jaw 34 against the wire whereupon the handle levers 10 and 11 are slowly moved toward one another to actuate the tool. This relative movement of the levers 10 and 11, which may be readily gripped in one hand, produces deflection of the spring 25 and angular or pivotal movement of the lever 12. By reason of the substantial mechanical advantage obtained by the relationships of the pivot pins 21 and 24, the spring actuating projection 22 and the terminal retaining stud 27, only a slight manual force exerted on the handle levers 10 and 11 produces a heavy tensile force on the assembly being tested. In fact, the tool may be readily designed so that slight manual exertion on the handle levers 10 and 11 will produce a tensile force of 250 lbs. on the assembly being tested. As the tool is operated the user or operator may observe the indicator 14 to determine the tensile force being applied to the assembly tested. In running non-destructive proof tests the manual force may be applied until the indicating pointer 43 reaches a given calibration 42 on the dial 41 or, if the slide 83 is in its released position, until the force on the pin 60 is sufficient to disengage the ball from the groove 66 as described above in connection with the description of means 9. Upon relieving the manual pressure on the levers 10 and 11 the spring 45 returns the parts to the normal positions, permitting easy disengagement of the wire and terminal assembly from the tool. The tool illustrated in Figure 6 is operated or used in the same manner except in this case the wire, rod, cord, or the like, is engaged between the spring urged self energizing jaws 15 to connect the part to be tested with the floating lever 12, the handle 32 being operated as in the other tool to secure the specimen to the lever 10 for the test. Upon completion of the test operation the handle 32 is moved to disengage or free the jaw 34 whereupon the test part may be moved to disengage it from the spring loaded jaws 50.

Having described only typical forms of the invention I do not wish to be limited to the specific details herein set forth, but wish to reserve to myself any variations or modifications that may appear to those skilled in the art and fall within the scope of the following claims.

I claim:

1. A pliers-like hand tool for tensile testing wires comprising a first handle lever, means on the first lever for gripping a wire, an arm projecting laterally from the first lever, a second handle lever mounted on the arm for pivotal movement, a third lever pivotally mounted on the arm between the first and second handle levers, the pivotal axis of the third lever being parallel with the axis of pivotal movement of the second handle lever, means on the third lever adjacent and at one side of its axis of pivotal movement for positively although manually releasably engaging the wire for movement therewith, a leaf spring secured to the third lever and extending therefrom to constitute an extension thereof projecting a substantial distance from the other side of the axis of pivotal movement of the third lever, means spaced remotely from said other side of the axis of pivotal movement of the third lever for transmitting force and movement from the second lever to the spring whereby relative angular movement between the first and second levers tensions the wire, and means on the third lever actuated by deflection and movement of the spring upon such tensioning of the wire to visibly indicate the tensile force applied to the wire.

2. A pliers-like hand tool for tensile testing wires comprising a first handle lever, means on the first lever for gripping a wire, an arm projecting laterally from the first lever, a second handle lever mounted on the arm for pivotal movement, a third lever pivotally mounted on the arm between the first and second handle levers, the pivotal axis of the third lever being parallel with the axis of pivotal movement of the second handle lever, means on the third lever adjacent and at one side of its axis of pivotal movement for positively although manually releasably engaging the wire for movement therewith, a leaf spring secured to the third lever and extending therefrom to constitute an extension thereof projecting a substantial distance from the other side of the axis of pivotal movement of the third lever, means spaced remotely from said other side of the axis of pivotal movement of the third lever for transmitting force and movement from the second lever to the spring whereby relative angular movement between the first and second levers tensions the wire, and a tensile force indicator on the third lever including a stem actuated by said spring upon deflection and movement of the same, the indicator visibly indicating the tension on the wire.

3. A hand tool for tensile testing an assembly of a wire and a terminal thereon, the terminal having an opening, said tool including a first handle lever, an arm projecting laterally from the first lever, a second handle lever mounted on the arm for pivotal movement, a third lever pivotally mounted on said arm between the first and second handle levers, the pivotal axis of the third lever being parallel with the axis of pivotal movement of said second lever, a means on each of said first lever and said third lever for engaging said assembly, one means being a stud for engaging in said opening and the other means being a wire gripping mechanism, said means on said third lever being adjacent one side of its axis of pivotal movement, a leaf spring secured to the third lever and extending therefrom to constitute an extension thereof projecting a substantial distance from the other side of the axis of pivotal movement of the third lever, means spaced remotely from said other side of the axis of pivotal movement of the third lever for transmitting force and movement from the second lever to the spring whereby relative angular movement between the first and second levers tensions the wire, and means on the third lever actuated by deflection and movement of the spring upon such tensioning of the wire to visibly indicate the tensile force applied to the wire.

4. A hand tool for tensile testing an assembly of a wire and a terminal thereon, the terminal having an opening, said tool including a first handle lever, and arm projecting laterally from the first lever, a second handle lever mounted on the arm for pivotal movement, a third lever pivotally mounted on said arm between the first and second handle levers, the pivotal axis of the third lever being parallel with the axis of pivotal movement of said second lever, a means on each of said first lever and said third lever for engaging said assembly, one means being a stud for engaging in said opening and the other means being a wire gripping mechanism, said means on said third lever being adjacent one side of its axis of pivotal movement, a leaf spring secured to the third lever and extending therefrom to constitute an extension thereof projecting a substantial distance from the other side of the axis of pivotal movement of the third lever, means spaced remotely from said other side of the axis of pivotal movement of the third lever for transmitting force and movement from the second lever to the spring whereby relative angular movement between the first and second levers tensions the wire, and means on the third lever actuated by deflection and movement of the spring upon such tensioning of the wire to visibly indicate the tensile force applied to the wire including a visible dial type indicator on the third lever having a movable stem actuated by the spring upon deflection of the spring as a result of the transmission of force and movement from the second lever to the spring.

5. A hand tool for tensile testing a wire comprising first and second handle levers, an arm projecting from the first lever, means mounting the second lever on the arm for pivotal movement, a third lever pivotally mounted on the arm between the first and second levers, a gripping means on each of said first and third levers for gripping the wire, the gripping means on said third lever being adjacent one side of its pivotal axis, a leaf spring secured to the third lever and extending therefrom to constitute an extension thereof projecting a substantial distance from the other side of the axis of pivotal movement of the third lever, means spaced remotely from said other side of the axis of pivotal movement of the third lever for transmitting force and movement from the second lever to the spring whereby relative angular movement between the first and second levers tensions the wire, and means on the third lever actuated by deflection and movement of the spring upon such tensioning of the wire to visibly indicate the tensile force applied to the wire.

6. A manually operable pull testing tool comprising a first lever having an elongate handle arm and a short outer portion, means on said outer portion for securing a part to be tested, an arm projecting laterally from said first lever adjacent said portion, a second lever pivoted on said arm and having an elongate handle arm, a third lever pivoted on said lateral arm to have a relatively short outer lever arm at one side of its pivotal axis and a longer flexible resilient inner lever arm at the other side of its pivotal axis lying adjacent said second lever, means on said outer arm of said third lever for securing said part, a member movably associated with said second lever to engage said inner arm of the third lever upon relative pivoting of the first and second levers and thus pivot the third lever to impose a tensile force on said part, and releasable means resisting movement of the member relative to said second lever and released to allow movement of the member relative to said second lever when said force reaches a given value.

7. A manually operable pull testing tool comprising a first lever having an elongate handle arm and a short outer portion, means on said outer portion for securing a part to be tested, an arm projecting laterally from said first lever adjacent said portion, a second lever pivoted on said arm and having an elongate handle arm, a third lever pivoted on said lateral arm to have a relatively short outer lever arm at one side of its pivotal axis and a longer flexible resilient inner lever arm at the other side of its pivotal axis lying adjacent said second lever, means on said outer arm of said third lever for securing said part, a movable member on said second lever engageable with said inner arm of the third lever upon relative pivoting of the first and second levers to flex said inner arm and thus impose a tensile force on said part, releasable means resisting movement of the member relative to said second lever and releasable when said force reaches a given value to allow movement of said member relative to said second lever and thus relieve said part of the force, and manually operable means for setting said releasable means to release upon the application of selected forces on said part.

8. A manually operable pull testing tool comprising a first lever having an elongate handle arm and a short outer portion, means on said outer portion for securing a part to be tested, an arm projecting laterally from said first lever adjacent said portion, a second lever pivoted on said arm and having an elongate handle arm, a third lever pivoted on said lateral arm to have a relatively short outer lever arm at one side of its pivotal axis and a longer flexible resilient inner lever arm at the other side of its pivotal axis lying adjacent said second lever, means on said outer arm of said third lever for securing said part, a movable member on said second lever engageable with said inner arm of the third lever upon relative pivoting of the first and second levers to flex said inner arm and thus impose a tensile force on said part, releasable means resisting movement of the member relative to said second lever and operable when said force reaches a given value to allow movement of said member relative to said second lever and thus relieve said part of the force, the releasable means including a cam surface on the member, and a spring loaded ball on the second lever cooperating with said cam surface, and means for manually turning said member to shift the cam surface relative to the ball and thus condition the cam surface to disengage from the ball upon application of selected tensile forces on said part.

References Cited in the file of this patent

UNITED STATES PATENTS

| 1,647,287 | Floyd | Nov. 1, 1927 |
| 2,494,571 | Milburn | Jan. 17, 1950 |

FOREIGN PATENTS

| 68,024 | Sweden | Dec. 23, 1927 |